(12) United States Patent
Sun et al.

(10) Patent No.: US 12,390,764 B2
(45) Date of Patent: Aug. 19, 2025

(54) EMMISSION CONTROL CATALYST ARTICLE WITH ENRICHED PGM ZONE

(71) Applicant: BASF Mobile Emissions Catalyst LLC, Iselin, NJ (US)

(72) Inventors: Yipeng Sun, West Windsor, NJ (US); Aleksei Vjunov, Parlin, NJ (US); Ke-Bin Low, East Brunswick, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 509 days.

(21) Appl. No.: 17/756,120

(22) PCT Filed: Nov. 22, 2020

(86) PCT No.: PCT/US2020/061706
§ 371 (c)(1),
(2) Date: May 18, 2022

(87) PCT Pub. No.: WO2021/102391
PCT Pub. Date: May 27, 2021

(65) Prior Publication Data
US 2023/0016066 A1    Jan. 19, 2023

Related U.S. Application Data

(60) Provisional application No. 62/939,117, filed on Nov. 22, 2019.

(51) Int. Cl.
*B01J 21/04*    (2006.01)
*B01D 53/94*    (2006.01)
(Continued)

(52) U.S. Cl.
CPC ....... *B01D 53/945* (2013.01); *B01D 53/9468* (2013.01); *B01D 53/9472* (2013.01);
(Continued)

(58) Field of Classification Search
CPC . B01J 21/04; B01J 21/066; B01J 23/10; B01J 23/42; B01J 23/44; B01J 23/464;
(Continued)

(56) References Cited

U.S. PATENT DOCUMENTS 5,948,723 A * 9/1999 Sung ................... B01J 35/19
                                                    502/340
8,637,426 B2 * 1/2014 Hoke .................. F01N 3/103
                                                    502/333

(Continued)

FOREIGN PATENT DOCUMENTS

EP    3616789 A1    3/2020
WO    2017/184256 A1    10/2017

OTHER PUBLICATIONS

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.

(Continued)

*Primary Examiner* — Cam N. Nguyen
(74) *Attorney, Agent, or Firm* — DLA Piper LLP (US)

(57) ABSTRACT

The present disclosure generally relates to emission control catalyst articles comprising a platinum group metal (PGM) enriched zone, methods of making such emission control catalyst articles, and methods of using such emission control catalyst articles.

19 Claims, 7 Drawing Sheets

| Rh/Al₂O₃ |
|---|
| Pd/OSC/Al₂O₃ |
| Substrate |
| Catalyst A |

| Rh/Pt/Al₂O₃ |
|---|
| Pd/OSC/Al₂O₃ |
| Substrate |
| Catalyst B |

| Rh/Pt/Al₂O₃/CeO₂ |
|---|
| Pd/OSC/Al₂O₃ |
| Substrate |
| Catalyst C |

| | Rh/Pt/Al₂O₃ |
|---|---|
| Pd | Pd/OSC/Al₂O₃ |
| Substrate | |
| Catalyst D | |

| | Rh/Pt/Al₂O₃/ZrO₂ |
|---|---|
| Pd | Pd/OSC/Al₂O₃ |
| Substrate | |
| Catalyst E | |

| | Rh/Pt/Al₂O₃/ZrO₂ |
|---|---|
| Pd/Al₂O₃ | Pd/OSC/ Al₂O₃ |
| Substrate | |
| Catalyst F | |

| Pt | Rh/Al₂O₃/CeO₂ |
|---|---|
| Pd/OSC/Al₂O₃ | |
| Substrate | |
| Catalyst G | |

| | Rh/Pt/Al₂O₃/CeO₂ |
|---|---|
| Pt | Pd/OSC/Al₂O₃ |
| Substrate | |
| Catalyst H | |

| Pt | Rh/Pt/Al₂O₃/CeO₂ |
|---|---|
| Pd/OSC/Al₂O₃ | |
| Substrate | |
| Catalyst I | |

(51) Int. Cl.
  *B01J 21/06* (2006.01)
  *B01J 23/10* (2006.01)
  *B01J 23/42* (2006.01)
  *B01J 23/44* (2006.01)
  *B01J 23/46* (2006.01)
  *B01J 23/63* (2006.01)
  *B01J 35/00* (2024.01)

(52) U.S. Cl.
  CPC ........... *B01D 2255/1021* (2013.01); *B01D 2255/1023* (2013.01); *B01D 2255/905* (2013.01); *B01D 2255/908* (2013.01)

(58) Field of Classification Search
  CPC ......... B01J 23/63; B01J 35/00; B01D 53/945; B01D 53/9468; B01D 53/9472
  USPC ........ 502/302–304, 332–334, 339, 349, 355, 502/415, 439, 527.12, 527.13
  See application file for complete search history.

(56) References Cited

U.S. PATENT DOCUMENTS

| | | | |
|---|---|---|---|
| 9,044,734 B2 * | 6/2015 | Grubert | B01D 53/944 |
| 9,333,490 B2 * | 5/2016 | Kazi | B01J 23/44 |
| 9,440,192 B2 * | 9/2016 | Hoke | F01N 3/035 |
| 9,662,611 B2 * | 5/2017 | Wan | B01D 53/9472 |
| 10,124,292 B2 * | 11/2018 | Wan | B01D 53/9472 |
| 10,137,414 B2 * | 11/2018 | Hoke | F01N 3/021 |
| 10,512,898 B2 * | 12/2019 | Deeba | F01N 3/101 |
| 11,154,847 B2 * | 10/2021 | Patchett | F01N 3/2825 |
| 11,248,505 B2 * | 2/2022 | Sung | B01J 23/02 |
| 11,813,598 B2 * | 11/2023 | Sung | F01N 3/103 |
| 11,982,218 B2 * | 5/2024 | Sung | B01J 23/02 |
| 2015/0298098 A1 | 10/2015 | Grammiccioni et al. | |
| 2019/0105637 A1 | 4/2019 | Suzuki et al. | |
| 2019/0240643 A1 * | 8/2019 | Karpov | B01J 37/0244 |
| 2019/0351393 A1 | 11/2019 | Nunan et al. | |
| 2022/0001370 A1 * | 1/2022 | Zheng | B01J 23/83 |
| 2022/0055021 A1 * | 2/2022 | Liu | F01N 3/2803 |
| 2022/0161236 A1 * | 5/2022 | Vjunov | B01J 23/002 |
| 2022/0203339 A1 * | 6/2022 | Zheng | B01J 21/04 |
| 2023/0147850 A1 * | 5/2023 | Aleksei | B01D 53/9468 423/213.5 |
| 2023/0330638 A1 * | 10/2023 | Chen | B01J 37/0228 |
| 2023/0338938 A1 * | 10/2023 | Vjunov | B01J 21/04 |

OTHER PUBLICATIONS

International Search Report for PCT Patent Application No. PCT/US2020/061706, Issued on Feb. 23, 2021, 4 pages.

* cited by examiner

| Rh/Al$_2$O$_3$ |
|---|
| Pd/OSC/Al$_2$O$_3$ |
| Substrate |
| Catalyst A |

| Rh/Pt/Al$_2$O$_3$ |
|---|
| Pd/OSC/Al$_2$O$_3$ |
| Substrate |
| Catalyst B |

| Rh/Pt/Al$_2$O$_3$/CeO$_2$ |
|---|
| Pd/OSC/Al$_2$O$_3$ |
| Substrate |
| Catalyst C |

| | Rh/Pt/Al$_2$O$_3$ |
|---|---|
| Pd | Pd/OSC/Al$_2$O$_3$ |
| | Substrate |
| | Catalyst D |

| | Rh/Pt/Al$_2$O$_3$/ZrO$_2$ |
|---|---|
| Pd | Pd/OSC/Al$_2$O$_3$ |
| | Substrate |
| | Catalyst E |

| | Rh/Pt/Al$_2$O$_3$/ZrO$_2$ |
|---|---|
| Pd/Al$_2$O$_3$ | Pd/OSC/Al$_2$O$_3$ |
| | Substrate |
| | Catalyst F |

| Pt | Rh/Al$_2$O$_3$/CeO$_2$ |
|---|---|
| | Pd/OSC/Al$_2$O$_3$ |
| | Substrate |
| | Catalyst G |

| | Rh/Pt/Al$_2$O$_3$/CeO$_2$ |
|---|---|
| Pt | Pd/OSC/Al$_2$O$_3$ |
| | Substrate |
| | Catalyst H |

| Pt | Rh/Pt/Al$_2$O$_3$/CeO$_2$ |
|---|---|
| | Pd/OSC/Al$_2$O$_3$ |
| | Substrate |
| | Catalyst I |

Fig. 1

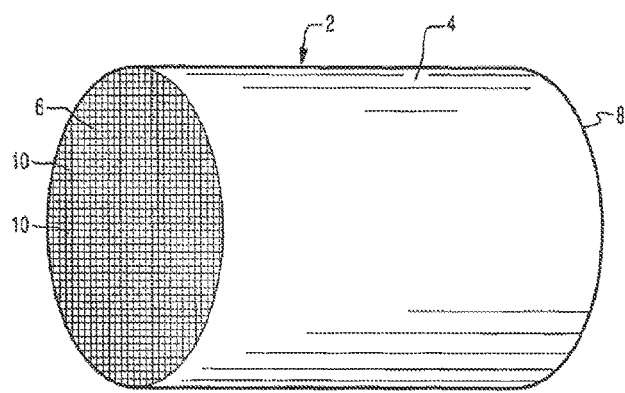
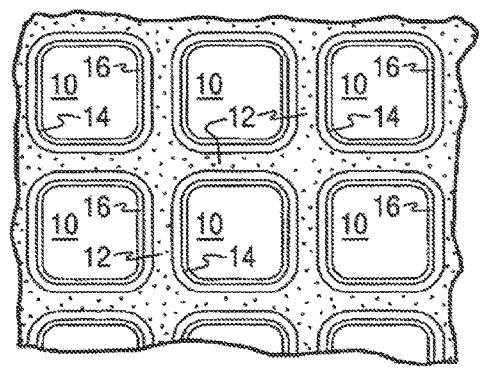
Fig. 6A
Fig. 6B

US 12,390,764 B2

EMMISSION CONTROL CATALYST ARTICLE WITH ENRICHED PGM ZONE

This application is a national stage of PCT/US2020/061706, filed Nov. 22, 2020, which claims the benefit of priority to U.S. Provisional Application No. 62/939,117, filed Nov. 22, 2019, the contents of which are hereby incorporated by reference in their entirety.

The present disclosure relates to emission control catalyst articles useful for the treatment of exhaust gases to reduce contaminants contained therein. Particularly, the present disclosure relates to emission control catalyst articles with an enriched platinum group metal (PGM) zone and methods of preparing such emission control catalyst articles.

Three-way conversion (TWC) catalysts (hereinafter interchangeably referred to as three-way conversion catalyst, three-way catalyst, TWC Catalyst, and TWC) have been utilized in the treatment of exhaust gas streams from internal combustion engines for several years. Generally, in order to treat or purify exhaust gas streams containing pollutants such as hydrocarbons, nitrogen oxides, and carbon monoxide, catalytic converters containing a three-way conversion catalyst are used in the exhaust gas line of an internal combustion engine. The three-way conversion catalyst oxidizes unburnt hydrocarbons and carbon monoxide and reduces nitrogen oxides. Most commercially available TWC catalysts contain palladium as a major platinum group metal (PGM) component which is used along with a lesser amount of rhodium.

TWC catalysts may be formed by coating a PGM metal containing slurry onto a substrate. The coating may be in the form of a layered structure comprising a bottom layer and a top layer. The platinum group metals may be coated on the substrate uniformly with a PGM loading ranging from about 3 g/ft$^3$ to about 300 g/ft$^3$. In another technique, the platinum group metals may be coated on the substrate in a zoned manner.

However, existing TWC catalysts do not provide sufficient reduction of pollutants such as NO$_x$, HC, and CO to meet increasingly stringent global emissions standards. Thus, there remains a need for improved TWC catalysts that more efficiently reduce pollutants such as NO$_x$, HC, and CO.

In one aspect, the present disclosure provides emission control catalyst articles with improvements in washcoat architecture, PGM type, and PGM loading amount, as well as improved coating strategies and methods of making such catalyst articles, in order to achieve higher reduction of pollutants such as NO$_x$, HC, and CO.

Accordingly, it was discovered that providing a PGM enrichment zone containing a high loading of PGM (such as, for example, up to 1000 g/ft$^3$), which can be deposited on a bottom layer and/or a top layer at an inlet or outlet portion of a substrate, achieves significantly higher pollutant reduction as compared to conventional TWC catalyst articles.

Thus, in one aspect, the present disclosure provides an emission control catalyst article comprising a substrate having an inlet axial end and an outlet axial end, a bottom washcoat layer coated on about 60% to about 100% of the axial length of the substrate, and a top washcoat layer coated on about 60% to about 100% of the axial length of the substrate such that the top washcoat layer covers at least about 60% of the axial length of the bottom washcoat layer, wherein the top washcoat layer and/or the bottom washcoat layer comprises a first portion comprising one or more platinum group metals and a second portion comprising one or more platinum group metals, wherein the first portion begins at the inlet axial end of the substrate, wherein the platinum group metal concentration in the first portion is about 2 to about 100 times higher than the platinum group metal concentration in the second portion, wherein the first portion has a length of about 0.25 inches to about 2 inches, and wherein the platinum group metal loading in the first portion is about 10 g/ft$^3$ to about 1000 g/ft$^3$, as determined axially from a first end of the first portion to a second end of the first portion.

In order to provide an understanding of certain embodiments of the present disclosure, reference is made to the appended drawings, which are not necessarily drawn to scale, and in which reference numerals refer to components of example embodiments of the present disclosure. The drawings are provided by way of example only and should not be construed as limiting the scope of the present disclosure.

FIG. 1 shows a schematic representation of the washcoat architecture of emission control catalyst articles prepared according to reference Examples 1 to 3 (Catalysts A, B, and C) and inventive Examples 4 to 9 (Catalysts D to I).

FIG. 6A shows a perspective view of an example honeycomb-type substrate carrier that may serve as the substrate in accordance with some embodiments of the present disclosure and may have the top and bottom washcoat layers and the PGM enrichment zone coated thereon.

FIG. 6B shows a partial cross-sectional view enlarged relative to FIG. 6A and taken along a plane parallel to the end faces of the substrate carrier of FIG. 6A, which shows an enlarged view of a plurality of the gas flow passages shown in FIG. 6A.

Figure 2:
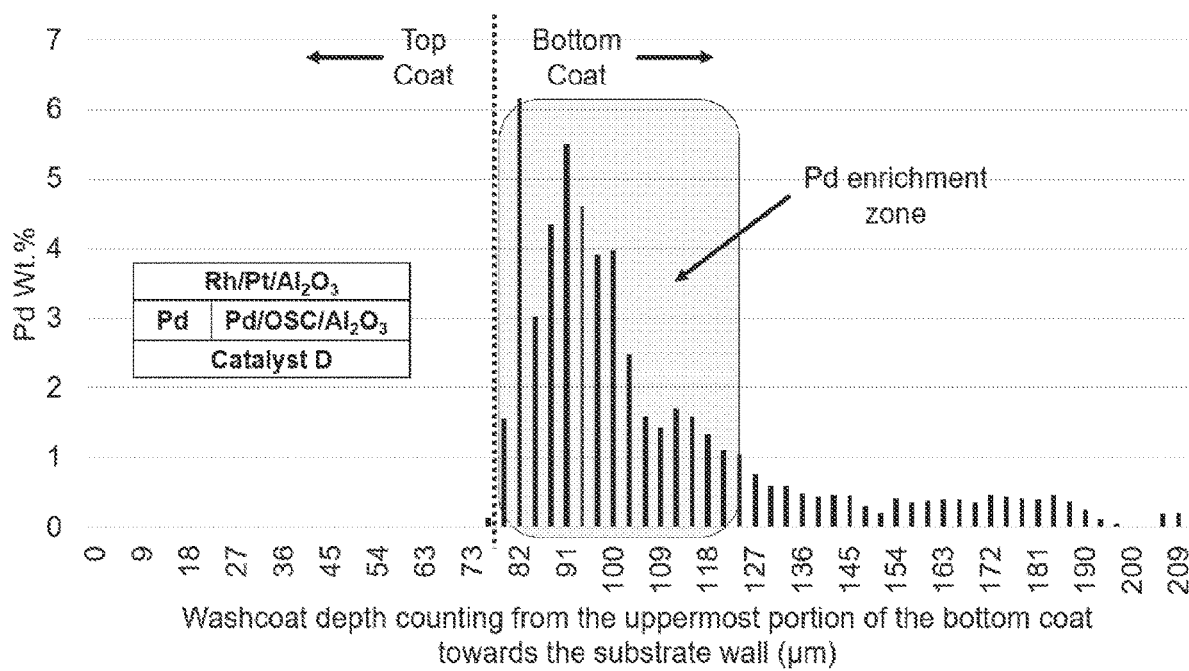
FIG. 2 shows the Pd gradient in the PGM enrichment zone in the bottom washcoat layer of Catalyst D prepared according to inventive Example 4. Inset: a schematic representation of the washcoat architecture of Catalyst D.
Figure 3:
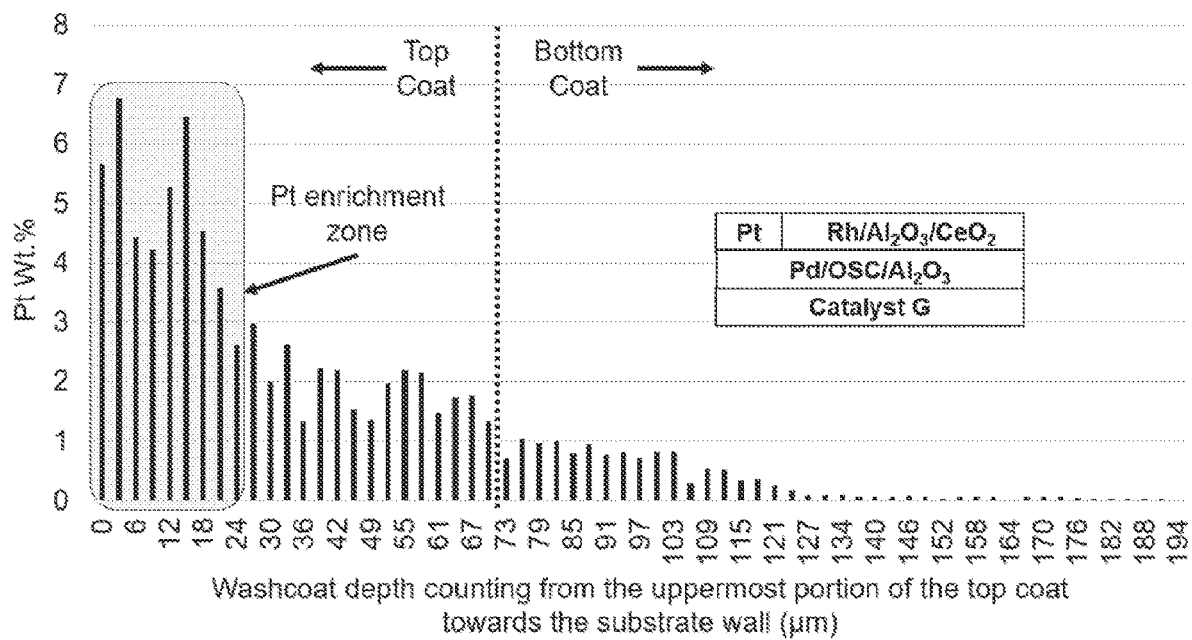
FIG. 3 shows the Pt gradient in the PGM enrichment zone in the top washcoat layer of Catalyst G prepared according to inventive Example 7. Inset: a schematic representation of the washcoat architecture of Catalyst G.

The present disclosure may be embodied in many different forms and should not be construed as limited to the embodiments set forth herein; rather, these embodiments are provided so that the present disclosure will be thorough and complete, and will fully convey the scope of the disclosure to those skilled in the art. No language in the specification should be construed as indicating that any non-claimed element is essential to the practice of the disclosed materials and methods.

The disclosure is not limited to the details of construction or process steps set forth in the following description. The disclosure is capable of other embodiments and of being practiced or being carried out in various ways. It is to be understood that the example embodiments described herein are merely illustrative of the principles and applications of the present disclosure. It will be apparent to those skilled in the art that various modifications and variations can be made to the methods and apparatuses of the present disclosure without departing from the spirit and scope of the disclosure. Thus, it is intended that the present disclosure include modifications and variations that are within the scope of the appended claims and their equivalents.

The use of the terms "a," "an," "the," and similar referents in the context of describing the materials and methods discussed herein (especially in the context of the following claims) are to be construed to cover both the singular and the plural, unless otherwise indicated herein or clearly contradicted by context.

The term "about" is used throughout this specification to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" includes the specific value. For instance, "about 5.0" includes 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The platinum group metal (PGM) refers to any component that includes a PGM (such as, for example, Rh, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," and the like refer to the respective platinum group metal compound, complex, or the like which, upon calcination or use of the catalyst, decomposes or otherwise converts to a catalytically active form, usually the metal or the metal oxide.

As used herein, the term "catalyst" or "catalyst composition" refers to a material that promotes or accelerates the rate of a reaction.

As used herein, the term "catalytic article" or "catalyst article" or "catalyst" refers to a component in which a substrate is coated with catalyst composition which is used to promote or accelerate a desired reaction. In some embodiments, the catalytic article is a layered catalytic article. The term layered catalytic article refers to a catalytic article in which a substrate is coated with a PGM composition(s) in a layered fashion. These composition(s) may be referred to as washcoat(s).

As used herein, the term "$NO_x$" refers to nitrogen oxide compounds, such as, for example, NO and/or $NO_2$.

In one aspect, the present disclosure provides an emission control catalyst article comprising a substrate having an inlet axial end and an outlet axial end, a bottom washcoat layer coated on about 60% to about 100% of the axial length of the substrate from the inlet axial end to the outlet axial end, and a top washcoat layer coated on about 60% to about 100% of the axial length of the substrate from either the inlet axial end or the outlet axial end of the substrate such that the top washcoat layer covers at least about 60% of the axial length of the bottom washcoat layer,
 wherein the top washcoat layer and/or the bottom washcoat layer comprises a first portion comprising one or more platinum group metals and a second portion comprising one or more platinum group metals,
 wherein the first portion begins at an inlet axial end of the substrate,
 wherein the platinum group metal concentration in the first portion is about 2 to about 100 times higher than the platinum group metal concentration in the second portion,
 wherein the first portion has an axial length of about 0.25 inches to about 2 inches, and
 wherein the platinum group metal loading in the first portion is about 10 $g/ft^3$ to about 1000 $g/ft^3$, as determined axially from a first end of the first portion to a second end of the first portion.

In some embodiments, the bottom washcoat layer is coated on about 70% to about 100% of the axial length of the substrate, such as, for example, about 80% to about 100% of the axial length of the substrate. In some embodiments, the bottom washcoat layer is coated on the total length of the substrate. In some embodiments, the top washcoat layer is coated on about 70% to about 100% of the axial length of the substrate, such as, for example, about 80% to about 100% of the axial length of the substrate. In some embodiments, the top washcoat layer is coated on the total length of the substrate. In some embodiments, the top washcoat layer covers at least about 70% of the bottom washcoat layer, such as at least about 80%, at least about 90%, or at least about 100% of the length of the bottom washcoat layer. In some embodiments, the top washcoat layer covers the total length of the bottom washcoat layer.

In some embodiments, the first portion is a PGM enriched zone formed by coating a portion of the top washcoat layer and/or the bottom washcoat layer, which layer is already pre-loaded with one or more platinum group metals, with an additional platinum group metal solution.

In some embodiments, the platinum group metal is chosen from platinum, palladium, rhodium, and combinations thereof.

In some embodiments, the platinum group metal is supported on a support chosen from an oxygen storage component, an alumina component, a ceria component, a zirconia component, and combinations thereof.

In some embodiments, the first portion has a length ranging from about 0.5 inches to about 1 inch.

In some embodiments, about 50% or more of the platinum group metal in the first portion exists in an uppermost third (%) of the first portion, as determined by an electron-probe microanalysis (EPMA) line scan moving from the uppermost surface of the first portion to the substrate. As used herein, the "uppermost surface" of the first portion corresponds to the surface of the washcoat layer comprising the first portion that is furthest from the underlying substrate, wherein the distance from the substrate surface is measured in a direction normal to the substrate surface.

In some embodiments, about 50% to about 95% of the platinum group metal in the first portion exists in an uppermost third (%) of the first portion, as determined by an electron-probe microanalysis (EPMA) line scan moving from the uppermost surface of the first portion to the substrate.

In some embodiments, the first portion comprises palladium.

In some embodiments, the first portion comprises platinum.

In some embodiments, the first portion comprises rhodium.

In some embodiments, the emission control catalyst article comprises a bottom washcoat layer comprising palladium or platinum deposited on a support chosen from an oxygen storage component, an alumina component, and combinations thereof, wherein the bottom washcoat layer is coated on about 60% to about 100% of the axial length of the substrate from the inlet axial end to the outlet axial end,
wherein the bottom washcoat layer comprises a first portion and a second portion,
wherein the first portion begins at an inlet axial end of the substrate and comprises palladium or platinum optionally supported on a support chosen from an oxygen storage component, an alumina component, and combinations thereof,
wherein the concentration of palladium or platinum in the first portion is about 2 to about 100 times higher than the concentration of palladium or platinum in the second portion,
wherein the first portion has an axial length of about 0.25 inches to about 2 inches, and
wherein the platinum group metal loading in the first portion is about 10 g/ft$^3$ to about 1000 g/ft$^3$, as determined axially from a first end of the first portion to a second end of the first portion; and
a top washcoat layer comprising rhodium, platinum, or a combination thereof impregnated on a support chosen from an oxygen storage component, an alumina component, and combinations thereof, wherein the top washcoat layer is coated on about 60% to about 100% of the axial length of the substrate from either the inlet or the outlet end of the substrate such that the top washcoat layer covers at least about 60% of the axial length of the bottom washcoat layer.

In some embodiments, the emission control catalyst article comprises a bottom washcoat layer comprising palladium impregnated on a support chosen from an oxygen storage component, an alumina component, and combinations thereof, wherein the bottom washcoat layer is coated on about 60% to about 100% of the axial length of the substrate from the inlet axial end to the outlet axial end;
a top washcoat layer comprising rhodium, platinum, palladium, or a combination thereof impregnated on a support chosen from an oxygen storage component, an alumina component, and combinations thereof, wherein the top washcoat layer is coated on about 60% to about 100% of the axial length of the substrate from either the inlet or the outlet end of the substrate such that the top washcoat layer covers at least about 60% of the axial length of the bottom washcoat layer,
wherein the top washcoat layer comprises a first portion comprising palladium or platinum optionally supported on a support chosen from an oxygen storage component, an alumina component, and combinations thereof, and a second portion comprising palladium or platinum,
wherein the first portion begins at an inlet axial end of the substrate, wherein the concentration of palladium or platinum in the first portion is about 2 to about 100 times higher than the concentration of palladium or platinum in the second portion,
wherein the first portion has an axial length ranging from about 0.25 inches to about 2 inches, and
wherein the platinum group metal loading in the first portion is about 10 to about 1000 g/ft$^3$, as determined axially from a first end of the first portion to a second end of the first portion.

In some embodiments, the first portion comprises palladium, wherein the amount of palladium in the first portion is about 30 to about 100 wt. % of the total palladium present in the catalyst article. For example, in some embodiments, the first portion comprises from about 50 to about 100 wt. %, from about 70 to about 100 wt. %, or from about 90 to about 100 wt. % of the total palladium present in the catalyst article.

In some embodiments, the first portion comprises platinum, wherein the amount of platinum in the first portion is about 30 to about 100 wt. % of the total platinum present in the catalyst article. For example, in some embodiments, the first portion comprises from about 50 to about 100 wt. %, from about 70 to about 100 wt. %, or from about 90 to about 100 wt. % of the total platinum present in the catalyst article.

In some embodiments, the first portion comprises a palladium or platinum concentration gradient, wherein the palladium or platinum concentration exponentially decreases from the top surface to the bottom surface of the washcoat layer on which the PGM enriched washcoat zone is coated. As used herein, the "top surface" of a washcoat layer corresponds to the surface of the washcoat layer furthest from the underlying substrate, whereas the "bottom surface" of a washcoat layer corresponds to the surface of the washcoat layer closest to the underlying substrate, wherein the distance from the substrate is measured in a direction normal to the substrate surface.

In some embodiments, the weight ratio of the total platinum group metal loading of the first portion to the total platinum group metal loading of the second portion ranges from about 4.0 to about 50. For example, in some embodiments, the weight ratio of the total platinum group metal loading of the first portion to the total platinum group metal loading of the second portion ranges from about 10 to about 50, from about 20 to about 50, from about 30 to about 50, or from about 40 to about 50.

In some embodiments, the alumina component comprises one or more components chosen from alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof.

In some embodiments, the oxygen storage component comprises one or more components chosen from ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, and combinations thereof.

In some embodiments, the zirconia component comprises one or more components chosen from lanthana-zirconia, barium-zirconia, and combinations thereof.

In some embodiments, the bottom washcoat layer comprises one or more alkaline-earth metal oxides chosen from barium oxide, strontium oxide, and combinations thereof. In some embodiments, the one or more alkaline-earth metal oxides is present in an amount ranging from about 1.0 wt. % to about 20 wt. %, based on the total weight of the bottom washcoat layer.

In some embodiments, the substrate is a ceramic substrate, metal substrate, ceramic foam substrate, polymer foam substrate, or a woven fibre substrate. In some embodiments, the substrate is a monolithic or honeycomb substrate.

As used herein, reference to a "monolithic substrate" or "honeycomb substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat may be formed by preparing a slurry containing a certain solid content (such as, for example, from about 15 to about 60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In some embodiments of the present disclosure, the substrate may comprise one or more washcoat layers. In some embodiments, each washcoat layer may differ from the other washcoat layers in some way. For example, the washcoat layers may differ in terms of the physical properties thereof (such as, for example, particle size or crystallite phase) and/or may differ in the chemical composition or catalytic function thereof.

As used herein, the catalyst article may be "fresh" meaning it is new and has not been exposed to any heat or thermal stress for a prolonged period of time. The term "fresh" may also mean that the catalyst was recently prepared and has not been exposed to any exhaust gases or elevated temperatures. By contrast, as used herein, an "aged" catalyst article is not fresh and has been exposed to exhaust gases and/or elevated temperatures (such as, for example, greater than 500° C.) for a prolonged period of time (such as, for example, greater than 3 hours).

In some embodiments, the substrate of the emission control catalyst article of the present disclosure may be constructed of any suitable material used for preparing automotive catalysts. In some embodiments, the substrate is a ceramic substrate, metal substrate, ceramic foam substrate, polymer foam substrate, or woven fibre substrate. In some embodiments, the substrate comprises a ceramic or a metal monolithic honeycomb structure.

In some embodiment, the substrate provides a plurality of wall surfaces upon which one or more washcoat layers comprising the catalyst compositions described herein are applied and adhered, thereby acting as a carrier for the catalyst compositions.

Examples of metallic substrates include substrates comprising heat resistant metals and metal alloys such as titanium and stainless steel as well as other alloys in which iron is a substantial or major component. In some embodiments, such alloys may contain one or more of nickel, chromium, and/or aluminium, and the total amount of these metals may comprise at least 15 wt. % of the alloy, such as, for example, from about 10 to 25 wt. % of chromium, from about 3 to 8 wt. % of aluminium, and up to about 20 wt. % of nickel. In some embodiments, the alloys may also comprise small or trace amounts of one or more metals such as manganese, copper, vanadium, titanium, and the like. In some embodiments, the surface of the metal substrate may be oxidized at high temperature, such as, for example, about 1000° C. or higher, to form an oxide layer on the surface of the substrate, improving the corrosion resistance of the alloy and facilitating adhesion of the washcoat layer to the metal surface.

In some embodiments, ceramic materials used to construct the substrate may comprise any suitable refractory material, such as, for example, cordierite, mullite, cordierite-alumina, silicon nitride, zircon mullite, spodumene, alumina-silica magnesia, zircon silicate, sillimanite, magnesium silicates, zircon, petalite, alumina, aluminosilicates, and the like.

In some embodiments, any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to about 900 cpsi. The wall thickness of flow-through substrates can vary, with a typical range being between about 0.002 and about 0.1 inches. In some embodiments, the substrate may be a flow-through substrate, such as, for example, a cordierite substrate having 400 cpsi and a wall thickness of 6 mil or 600 cpsi and a wall thickness of 4.0 mil. However, it will be understood that the present disclosure is not limited to a particular substrate type, material, or geometry. In other embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. In some embodiments, the monolithic substrates may contain up to about 700 or more cpsi, such as about 100 to about 400 cpsi or about 200 to about 300 cpsi. The cross-sectional shape of the cells can vary as described above. Wall-flow substrates have a wall thickness between 0.002 and 0.1 inches. In at some embodiments, a representative wall-flow substrate is constructed from a porous cordierite, an example of which has about 200 cpsi and about 10 mil wall thickness or about 300 cpsi with about 8 mil wall thickness, and wall porosity in the range of about 45 to about 65%. In other embodiments, other ceramic materials such as aluminum-titanate, silicon carbide, and silicon nitride may also be used as wall-flow filter substrates. However, it will be understood that the present disclosure is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In some embodiments, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

FIGS. 6A and 6B illustrate an exemplary substrate 2 in the form of a flow-through substrate coated with washcoat compositions as described herein. Referring to FIG. 6A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 7, walls 12 are so dimensioned and configured that gas flow passages 10 have a substantially regular polygonal shape. As shown, the washcoat compositions can be applied in multiple, distinct layers if desired. In the illustrated embodiment, the washcoats comprise a discrete first washcoat layer 14 adhered to the walls 12 of the substrate member and a second discrete washcoat layer 16 coated over the first washcoat layer 14. In at least one embodiment, the presently claimed disclosure is also practiced with two or more (e.g., 3, or 4) washcoat layers and is not limited to the illustrated two-layer embodiment.

Figure 7:
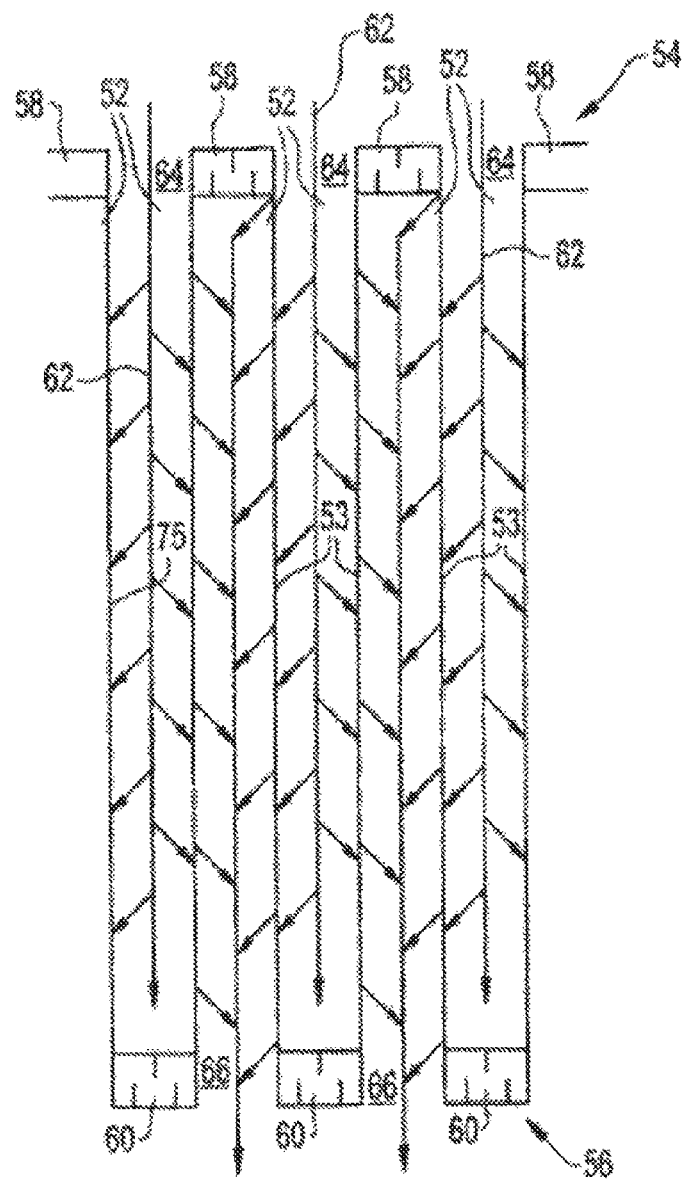
FIG. 7 shows a cutaway view of a section enlarged relative to FIG. 6A, wherein the example honeycomb-type substrate in FIG. 6A represents a wall-flow filter substrate monolith.

FIG. 7 illustrates an example substrate 2 in the form of a wall flow filter substrate coated with a washcoat composition as described herein. As seen in FIG. 7, the example substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This disclosure includes the use of one or more layers of catalytic material on the inlet and/or outlet walls of the element.

In another aspect of the present disclosure, there is provided processes for the preparation of emission control catalyst articles according to the present disclosure.

In some embodiments, the process for preparing an emission control catalyst article comprises: a) preparing a bottom washcoat layer coated on about 60% to about 100% of the axial length of a substrate from the inlet axial end to the outlet axial end, wherein preparing the bottom washcoat layer comprises obtaining a slurry comprising one or more platinum group metals impregnated onto one or more supports and coating said slurry on about 60% to about 100% of the axial length of the substrate; b) coating a portion of the bottom washcoat layer which begins at an inlet axial end of the substrate with a platinum group metal solution for a length of about 0.25 inches to about 2 inches followed by drying at a temperature of about 100° C. to about 140° C. and calcination to obtain a PGM enriched zone; and c) preparing a top washcoat layer coated on about 60% to about 100% of the axial length of the substrate from either the inlet axial end or the outlet axial end of the substrate such that the top washcoat layer covers at least about 60% of the axial length of the bottom washcoat layer, wherein preparing the top washcoat layer comprises obtaining a slurry comprising one or more platinum group metals impregnated onto one or more supports and coating the slurry over at least about 60% of the axial length of the bottom washcoat layer.

In some embodiments, the process for preparing an emission control catalyst article comprises: a) preparing a bottom washcoat layer coated on about 60% to about 100% of the axial length of a substrate from the inlet axial end to the outlet axial end of the substrate, wherein preparing the bottom washcoat layer comprises obtaining a slurry comprising one or more platinum group metals impregnated onto one or more supports and coating said slurry on about 60% to about 100% of the length of the substrate; b) preparing a top washcoat coated on about 60% to about 100% of the axial length of the substrate from either the inlet axial end or the outlet axial end of the substrate such that the top washcoat layer covers at least about 60% of the length of the bottom washcoat layer, wherein preparing the top washcoat layer comprises obtaining a slurry comprising one or more platinum group metals impregnated onto one or more supports and coating the slurry over at least about 60% of the length of the bottom washcoat layer; and c) coating a portion of the top washcoat layer which begins at an inlet axial end of the substrate with a platinum group metal solution for a length of about 0.25 inches to about 2 inches followed by drying at a temperature of about 100° C. to about 140° C. and calcination to obtain an enriched PGM zone.

In some embodiments, the emission control catalyst article prepared by the aforementioned processes may be any emission control catalyst article according to the present disclosure as described herein.

In some embodiments, the step of preparing the slurry comprises a technique chosen from incipient wetness impregnation, incipient wetness co-impregnation, post-addition, and combinations thereof.

Incipient wetness impregnation techniques, also called capillary impregnation or dry impregnation are commonly used for the synthesis of heterogeneous materials, such as, for example, catalysts. An active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor can be introduced to a slurry via post-addition under agitation during the process of slurry preparation.

The support particles are dry enough to absorb substantially all of the solution to form a moist solid. Aqueous solutions of water-soluble compounds or complexes of the active metal are utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (such as, for example, at about 100° C. to about 150° C.) for a period of time (such as, for example, about 1-3 hours), and then calcined to convert the active metal to a more catalytically active form. An example of a calcination process involves heat treatment in air at a temperature of about 400-550° C. for 10 minutes to 3 hours. The above process can be repeated as needed to reach the desired level of loading of the active metal by means of impregnation.

In some embodiments, the above-noted catalyst compositions are prepared in the form of catalyst particles as noted above. These catalyst particles are mixed with water to form a slurry for purposes of coating a catalyst substrate, such as a honeycomb-type substrate. In some embodiments, in addition to the catalyst particles, the slurry may optionally comprise a binder in the form of alumina, silica, zirconium acetate, colloidal zirconia, or zirconium hydroxide, associative thickeners, and/or surfactants (including anionic, cationic, non-ionic or amphoteric surfactants). Other examples of binders include boehmite, gamma-alumina, or delta/theta alumina, as well as silica sol. When present, the binder may be used in an amount ranging from about 1.0 to about 5.0 wt. % of the total washcoat loading. Addition of acidic or basic species to the slurry may be carried out to adjust the pH accordingly. For example, in some embodiments, the pH of the slurry may be adjusted by the addition of ammonium hydroxide, aqueous nitric acid, or acetic acid. An example pH range for the slurry is about 3.0 to about 12.

In some embodiments, the slurry may be milled to reduce the particle size and/or enhance particle mixing. The milling may be accomplished in a ball mill, continuous mill, or other similar equipment, and the solids content of the slurry may be about 20 to 60 wt. %, such as, for example, about 20 to 40 wt. %. In some embodiments, the post-milling slurry is characterized by a D90 particle size of about 3.0 to about 40 microns, such as, for example, from about 10 to about 30 microns, or from about 10 to about 15 microns. The D90 may be determined using a dedicated particle size analyser. For example, laser diffraction may be used to measure particle sizes in small volumes of slurry. The D90, with units of microns, means 90% of the particles by number have a diameter less than the specified value.

The slurry may be coated on the catalyst substrate using any suitable washcoat technique. In some embodiments, the catalyst substrate is dipped one or more times into the slurry or otherwise coated with the slurry. Thereafter, the coated substrate is dried at an elevated temperature (such as, for example, about 100° C. to about 150° C.) for a period of time (such as, for example, about 10 minutes to about 3 hours) and then calcined by heating (such as, for example, at about 400° C. to 700° C. for about 10 minutes to about 3 hours). Following drying and calcining, the final washcoat coating layer may be essentially solvent-free. After calcining, the catalyst loading obtained by the above described washcoat techniques can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In some embodiments, the coated substrate is aged by subjecting the coated substrate to heat treatment. In some embodiments, aging is done at a temperature of about 850° C. to about 1050° C. in an environment of 10 vol. % water in an alternating hydrocarbon/air feed for about 50 to about 75 hours. Aged catalyst articles are thus provided in some embodiments. In some embodiments, particularly effective materials comprise metal oxide-based supports (including, but not limited to substantially 100% ceria supports) that maintain a high percentage (e.g., about 95 to 100%) of their pore volumes upon aging (e.g., at about 850° C. to about 1050° C., 10 vol. % water in an alternating hydrocarbon/air feed, for about 50 to about 75 hours).

In another aspect, there is provided an exhaust system for internal combustion engines, said system comprising an emission control catalyst article according to the present disclosure.

In another aspect, there is provided a method of treating a gaseous exhaust stream comprising hydrocarbons, carbon monoxide, and nitrogen oxides, the method comprising contacting the exhaust stream with an emission control catalyst article or exhaust system according to the present disclosure.

In another aspect, there is provided a method of reducing hydrocarbon, carbon monoxide, and nitrogen oxide levels in a gaseous exhaust stream, the method comprising contacting the gaseous exhaust stream with a catalyst article or exhaust system according to the present disclosure to reduce the levels of hydrocarbons, carbon monoxide, and nitrogen oxides in the exhaust gas stream.

In another aspect, there is provided use of an emission control catalyst article or exhaust system according to the present disclosure for purifying a gaseous exhaust stream comprising hydrocarbons, carbon monoxide, and nitrogen oxides.

Example Embodiments:

Without limitation, some embodiments of the present disclosure include:

Embodiment 1. An emission control catalyst article comprising:
a substrate having an inlet axial end and an outlet axial end,
a bottom washcoat layer coated on about 60% to about 100% of the axial length of the substrate from the inlet axial end to the outlet axial end, and
a top washcoat layer coated on about 60% to about 100% of the axial length of the substrate from either the inlet or the outlet end of the substrate such that the top washcoat layer covers at least about 60% of the length of the bottom washcoat layer,
wherein the top washcoat layer and/or the bottom washcoat layer comprises a first portion and a second portion, wherein the first portion begins at the inlet axial end of the substrate and exhibits a platinum group metal concentration about 2 to about 100 times higher than the concentration of a platinum group metal in the second portion, wherein the first portion has a length of about 0.25 inches to about 2 inches, and wherein the platinum group metal loading is about 10 $g/ft^3$ to about 1000 $g/ft^3$, as determined axially from a first end of the first portion to a second end of the first portion.

Embodiment 2. The emission control catalyst article according to Embodiment 1, wherein the first portion is a PGM enriched zone formed by coating a portion of the top washcoat layer and/or the bottom washcoat layer, which layer is already pre-loaded with platinum group metal, with an additional platinum group metal solution.

Embodiment 3. The emission control catalyst article according to Embodiment 1 or 2, wherein the platinum group metal is chosen from platinum, palladium, rhodium and combinations thereof.

Embodiment 4. The emission control catalyst article according to any one of Embodiments 1 to 3, wherein the platinum group metal is supported on a support chosen from an oxygen storage component, an alumina component, a ceria component, a zirconia component, and combinations thereof.

Embodiment 5. The emission control catalyst article according to any one of Embodiments 1 to 4, wherein the first portion has a length ranging from about 0.5 inches to about 1 inches.

Embodiment 6. The emission control catalyst article according to any one of Embodiments 1 to 5, wherein 50% or more of the platinum group metal in the first portion exists in an uppermost third (%) of the first portion, as determined by an electron-probe microanalysis (EPMA) line scan from an uppermost surface of the first portion to the substrate.

Embodiment 7. The emission control catalyst article according to any one of Embodiments 1 to 6, wherein 50% to 95% of the platinum group metal in the first portion exists in an uppermost third (%) of the first portion, as determined by an electron-probe microanalysis (EPMA) line scan from an uppermost surface of the first portion to the substrate.

Embodiment 8. The emission control catalyst article according to any one of Embodiments 1 to 7, wherein the first portion comprises palladium. Embodiment 9. The emission control catalyst article according to any one of Embodiments 1 to 7, wherein the first portion comprises platinum.

Embodiment 10. The emission control catalyst article according to any one of Embodiments 1 to 7, wherein the first portion comprises rhodium.

Embodiment 11. The emission control catalyst article according to any one of Embodiments 1 to 10, wherein the article comprises:

a bottom washcoat layer comprising palladium or platinum supported on a support chosen from an oxygen storage component, an alumina component, and combinations thereof, coated on about 60% to about 100% of the axial length of the substrate from the inlet axial end to the outlet axial end, wherein the bottom washcoat layer comprises a first portion and a second portion, wherein the first portion begins at the inlet axial end of the substrate and comprises palladium or platinum optionally supported on a support chosen from an oxygen storage component, an alumina component, and combinations thereof, wherein the concentration of palladium or platinum in the first portion is about 2 to about 100 times higher than the concentration of palladium or platinum in the second portion, wherein the first portion has a length of about 0.25 inches to about 2 inches, and wherein the platinum group metal loading is about 10 g/ft³ to about 1000 g/ft³, as determined axially from a first end of the first portion to a second end of the first portion; and a top washcoat layer comprising rhodium, platinum, or a combination thereof.

supported on a support chosen from an oxygen storage component, an alumina component, and combinations thereof, coated on about 60% to about 100% of the axial length of the substrate from either the inlet axial end or the outlet end of the substrate such that the top washcoat layer covers at least about 60% of the axial length of the bottom washcoat layer.

Embodiment 12. The emission control catalyst article according to any one of Embodiments 1 to 10, wherein the article comprises:

a bottom washcoat layer comprising palladium supported on a support chosen from an oxygen storage component, an alumina component, and combinations thereof, coated on about 60% to about 100% of the axial length of the substrate from the inlet axial end to the outlet axial end;

a top washcoat layer comprising a platinum group metal chosen from rhodium, platinum, palladium, and combinations thereof supported on a support chosen from an oxygen storage component, an alumina component, and combinations thereof, coated on about 60% to about 100% of the axial length of the substrate from either the inlet or the outlet end of the substrate such that the top washcoat layer covers at least about 60% of the axial length of the bottom washcoat layer, wherein the top washcoat layer comprises a first portion and a second portion, wherein the first portion begins at an inlet axial end of the substrate and comprises palladium or platinum optionally supported on a support chosen from an oxygen storage component, an alumina component, and combinations thereof, wherein the concentration of palladium or platinum in the first portion is about 2 to about 100 times higher than the concentration of palladium or platinum in the second portion, wherein the first portion has a length of about 0.25 inches to about 2 inches, and wherein the platinum group metal loading is about 10 g/ft³ to about 1000 g/ft³, as determined axially from a first end of the first portion to a second end of the first portion.

Embodiment 13. The emission control catalyst article according to any one of Embodiments 8, 11, or 12, wherein the first portion comprises about 30 to about 100 wt. %, about 50 to about 100 wt. %, about 70 to about 100 wt. %, or about 90 to about 100 wt. % of the total palladium present in the catalyst article.

Embodiment 14. The emission control catalyst article according to any one of Embodiments 9, 11, or 12, wherein the first portion comprises about 30 to about 100 wt. %, about 50 to about 100 wt. %, about 70 to about 100 wt. %, or about 90 to about 100 wt. % of the total platinum present in the catalyst article.

Embodiment 15. The emission control catalyst article according to Embodiment 11 or 12, wherein the first portion comprises a palladium or platinum concentration gradient, wherein the palladium or platinum concentration exponentially decreases from the top surface of the washcoat layer comprising the first portion to the bottom surface of the washcoat layer comprising the first portion.

Embodiment 16. The emission control catalyst article according to any one of Embodiments 1 to 15, wherein the weight ratio of the platinum group metal of the first portion to the platinum group metal of the second portion ranges from about 4.0 to about 50, from about 10 to about 50, from about 20 to about 50, from about 30 to about 50, or from about 40 to about 50.

Embodiment 17. The emission control catalyst article according to any one of Embodiments 4, 11, and 12, wherein the alumina component comprises one or more components chosen from alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof.

Embodiment 18. The emission control catalyst article according to any one of Embodiments 4, 11, and 12, wherein the oxygen storage component comprises one or more components chosen from ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, and combinations thereof.

Embodiment 19. The emission control catalyst article according to Embodiment 4, wherein the zirconia component comprises one or more components chosen from lanthana-zirconia, barium-zirconia, and combinations thereof.

Embodiment 20. The emission control catalyst article according to any one of Embodiments 1 to 19, wherein the bottom washcoat layer comprises one or more alkaline-earth metal oxides chosen from barium oxide, strontium oxide, and combinations thereof.

Embodiment 21. The emission control catalyst article according to Embodiment 20, wherein the one or more alkaline-earth metal oxides is present in an amount ranging from about 1.0 wt. % to about 20 wt. %, based on the total weight of the bottom washcoat layer.

Embodiment 22. The emission control catalyst article according to any one of Embodiments 1 to 21, wherein the substrate is a ceramic substrate, a metal substrate, a ceramic foam substrate, a polymer foam substrate, or a woven fibre substrate.

Embodiment 23. The emission control catalyst article according to any one of Embodiments 1 to 22, wherein the bottom washcoat layer is coated on about 70% to about 100% of the axial length of the substrate, about 80% to about 100% of the axial length of the substrate, or about 100% of the axial length of the substrate.

Embodiment 24. The emission control catalyst article according to any one of Embodiments 1 to 23, wherein the top washcoat layer is coated on about 70% to about 100% of the axial length of the substrate, about 80% to about 100% of the axial length of the substrate, or about 100% of the axial length of the substrate.

Embodiment 25. The emission control catalyst article according to any one of Embodiments 1 to 24, wherein the top washcoat layer covers at least about 70%, at least about 80%, at least about 90%, or at least about 100% of the length of the bottom washcoat layer.

Embodiment 26. A process for the preparation of an emission control catalyst article according to any one of Embodiments 1 to 11 or 13 to 25, comprising:

preparing a bottom washcoat layer coated on about 60% to about 100% of the axial length of a substrate from the inlet axial end of the substrate to the outlet axial end of the substrate, wherein preparing the bottom washcoat layer comprises obtaining a slurry comprising one or more platinum group metals impregnated onto one or more supports and coating said slurry on about 60% to about 100% of the axial length of the substrate;

b) coating a portion of the bottom washcoat layer which begins at the inlet axial end of the substrate with a platinum group metal solution for a length of about 0.25 inches to about 2 inches followed by drying at a temperature ranging from about 100° C. to about 140° C. and calcination to obtain a PGM enriched zone; and c) preparing a top washcoat layer coated on about 60% to about 100% of the axial length of the substrate from either the inlet axial end or the outlet axial end of the substrate such that the top washcoat layer covers at least about 60% of the length of the bottom washcoat layer, wherein preparing the top washcoat layer comprises obtaining a slurry comprising one or more platinum group metals impregnated onto one or more supports and coating the slurry over at least about 60% of the axial length of the bottom washcoat layer.

Embodiment 27. A process for the preparation of an emission control catalyst article according to any one of Embodiments 1 to 10 or 12 to 25, comprising:

a) preparing a bottom washcoat layer coated on about 60% to about 100% of the axial length of a substrate from the inlet axial end to the outlet axial end of the substrate, wherein preparing the bottom washcoat layer comprises obtaining a slurry comprising one or more platinum group metals impregnated onto one or more supports and coating said slurry on about 60% to about 100% of the axial length of the substrate;

b) preparing a top washcoat layer coated on about 60% to about 100% of the axial length of the substrate from either the inlet axial end or the outlet axial end of the substrate such that the top washcoat layer covers at least about 60% of the length of the bottom washcoat layer, wherein preparing the top washcoat layer comprises obtaining a slurry comprising one or more platinum group metals impregnated onto one or more supports and coating the slurry over at least about 60% of the length of the bottom washcoat layer; and c) coating a portion of the top washcoat layer which begins at the inlet axial end of the substrate with a platinum group metal solution for a length of about 0.25 inches to about 2 inches followed by drying at a temperature ranging from about 100° C. to about 140° C. and calcination to obtain a PGM enriched zone.

Embodiment 28. An exhaust system for internal combustion engines, said system comprising the emission control catalyst article according to any one of Embodiments 1 to 25.

Embodiment 29. A method of treating a gaseous exhaust stream comprising hydrocarbons, carbon monoxide, and nitrogen oxides, the method comprising contacting the exhaust stream with the emission control catalyst article according to any one of Embodiments 1 to 25 or the exhaust system according to Embodiment 28.

Embodiment 30. A method of reducing hydrocarbon, carbon monoxide, and nitrogen oxide levels in a gaseous exhaust stream, the method comprising contacting the gaseous exhaust stream with the emission control catalyst article according to any one of Embodiments 1 to 25 or the exhaust system according to Embodiment 28 to reduce the levels of hydrocarbons, carbon monoxide, and nitrogen oxides in the exhaust gas.

Embodiment 31. Use of the emission control catalyst article according to any one of Embodiments 1 to 25 for purifying a gaseous exhaust stream comprising hydrocarbons, carbon monoxide, and nitrogen oxides.

The emission control catalyst articles and methods of making the same described hereinabove will be further described by the following non-limiting Examples, which are intended to be purely exemplary.

EXAMPLE 1

Preparation of CC1 Reference Catalyst A

Reference catalyst A is a Pd/Rh catalytic article with a PGM loading of 80 g/ft$^3$ (Pt/Pd/Rh=0/76/4). The catalyst A is a two-layer washcoat architecture coated onto a cylindrical monolithic cordierite substrate having dimensions of 4.66" in diameter and 3.58" in length, a cell density of 600 cpsi, and a wall thickness of 3.5 mils.

Preparation of the bottom coat: 38 g/ft$^3$ of Pd (50 wt. % of the total Pd) in the form of palladium precursor solution was impregnated onto a refractory alumina, and 38 g/ft$^3$ of Pd (50 wt. % of the total Pd) in the form of palladium precursor solution was impregnated onto a stabilized ceria-zirconia composite with approximately 40 wt. % ceria. A slurry containing about 35.2 wt. % of the refractory $Al_2O_3$, 49.6 wt. % of the stabilized ceria-zirconia composite, barium acetate to yield 11.6 wt. % of BaO, zirconium acetate to yield 1.9 wt. % of $ZrO_2$, and 1.7 wt. % of Pd was coated onto the substrate. The washcoat loading of the bottom coat was about 2.59 g/in$^3$ after calcination at 550° C. for 1 hour in air.

Preparation of the top coat: 4 g/ft$^3$ of Rh (100 wt. % of the total Rh) in the form of rhodium precursor solution was impregnated onto a refractory alumina. A slurry mixture containing about 84.8 wt. % of the refractory $Al_2O_3$, 15.0 wt. % of a ceria-zirconia composite with approximately 50 wt. % ceria, and 0.23 wt. % of Rh was coated over the bottom coat. The washcoat loading of the top coat was about 1.00 g/in$^3$ after calcination at 550° C. for 1 hour in air. The reference Pd/Rh catalytic article is illustrated in FIG. 1.

EXAMPLE 2

Preparation of CC1 Reference Catalyst B

Reference catalyst B is a Pt/Pd/Rh catalytic article with a PGM loading of 80 g/ft$^3$ (Pt/Pd/Rh=38/38/4). The catalyst B is a two-layer washcoat architecture coated onto a cylindrical monolith cordierite substrate having dimensions of 4.66" in diameter and 3.58" in length, a cell density of 600 cpsi, and a wall thickness of 3.5 mils.

Preparation of the bottom coat: 19 g/ft$^3$ of Pd (50 wt. % of the total Pd) in the form of palladium precursor solution was impregnated onto a refractory alumina, and 19 g/ft$^3$ of Pd (50 wt. % of the total Pd) in the form of palladium precursor solution was impregnated onto a stabilized ceria-zirconia composite with approximately 40 wt. % ceria. A slurry containing about 35.4 wt. % of the refractory $Al_2O_3$, 50.1 wt. % of the stabilized ceria-zirconia composite, barium acetate to yield 11.7 wt. % of BaO, zirconium acetate to yield 2.0 wt. % of $ZrO_2$, and 0.9 wt. % of Pd was coated onto the substrate. The washcoat loading of the bottom coat was about 2.56 g/in$^3$ after calcination at 550° C. for 1 hour in air.

Preparation of the top coat: 4 g/ft$^3$ of Rh (100 wt. % of the total Rh) and 38 g/ft$^3$ of Pt (100 wt. % of the total Pt) in the form of rhodium precursor solution and Pt precursor solution were impregnated onto a refractory alumina. A slurry mixture containing about 83.1 wt. % of the refractory $Al_2O_3$, 14.6 wt. % of a ceria-zirconia composite with approximately 50 wt. % ceria, 0.2 wt. % of Rh and 2.1 wt. % Pt was coated over the bottom coat. The washcoat loading of the top coat was about 1.02 g/in$^3$ after calcination at 550° C. for 1 hour in air. Catalyst B is illustrated in FIG. 1.

EXAMPLE 3

Preparation of CC1 Reference Catalyst C

Reference Catalyst C is a Pt/Pd/Rh catalytic article with a PGM loading of 80 g/ft$^3$ (Pt/Pd/Rh=38/38/4). The catalyst C is a two-layer washcoat architecture coated onto a cylindrical monolith cordierite substrate having dimensions of 4.66" in diameter and 3.58" in length, a cell density of 600 cpsi, and a wall thickness of 3.5 mils.

Preparation of the bottom coat: 19 g/ft$^3$ of Pd (50 wt. % of the total Pd) in the form of palladium precursor solution was impregnated onto a refractory alumina, and 19 g/ft$^3$ of Pd (50 wt. % of the total Pd) in the form of palladium precursor solution was impregnated onto a stabilized ceria-zirconia composite with approximately 40 wt. % ceria. A slurry containing about 35.4 wt. % of the refractory $Al_2O_3$, 50.1 wt. % of the stabilized ceria-zirconia composite, barium acetate to yield 11.7 wt. % of BaO, zirconium acetate to yield 2.0 wt. % of $ZrO_2$, and 0.9 wt. % of Pd was coated onto the substrate. The washcoat loading of the bottom coat was about 2.56 g/in$^3$ after calcination at 550° C. for 1 hour in air.

Preparation of the top coat: 4 g/ft$^3$ of Rh (100 wt. % of the total Rh) and 38 g/ft$^3$ of Pt (100 wt. % of the total Pt) in the form of rhodium precursor solution and Pt precursor solution were impregnated onto a refractory alumina/ceria. A slurry mixture containing about 83.1 wt. % of the refractory $Al_2O_3$/$CeO_2$, 14.6 wt. % of a ceria-zirconia composite with approximately 50 wt. % ceria, 0.2 wt. % of Rh and 2.1 wt. % Pt was coated over the bottom coat. The washcoat loading of the top coat was about 1.02 g/in$^3$ after calcination at 550° C. for 1 hour in air. Catalyst C is illustrated in FIG. 1.

EXAMPLE 4

Preparation of CC1 Inventive Catalyst D

Inventive Catalyst D is a Pt/Pd/Rh catalytic article with a PGM loading of 80 g/ft$^3$ (Pt/Pd/Rh=38/38/4). Catalyst D comprises a washcoat architecture composed of a bottom coat, an additional PGM enrichment zone in the inlet side of the catalyst, and a top coat coated onto a cylindrical monolithic cordierite substrate having dimensions of 4.66" in diameter and 3.58" in length, a cell density of 600 cpsi, and a wall thickness of 3.5 mils.

Preparation of the bottom coat: 7.6 g/ft$^3$ of Pd (20 wt. % of the total Pd) in the form of palladium precursor solution was impregnated onto a refractory alumina, and 7.6 g/ft$^3$ of Pd (20 wt. % of the total Pd) in the form of palladium precursor solution was impregnated onto a stabilized ceria-zirconia composite with approximately 40 wt. % ceria. A slurry, which contained about 35.6 wt. % of the refractory $Al_2O_3$, 50.3 wt. % of the stabilized ceria-zirconia composite, barium acetate to yield 11.8 wt. % of BaO, zirconium acetate to yield 2.0 wt. % of $ZrO_2$, and 0.3 wt. % of Pd, was coated onto the substrate. The washcoat loading of the bottom coat was about 2.55 g/in$^3$ after calcination at 550° C. for 1 hour in air.

Preparation of the enrichment zone in the inlet side of the catalyst:

A Pd precursor solution comprising 152 g/ft$^3$ Pd (60% of the total Pd) was allowed to absorb from the inlet end of the substrate already containing the bottom coat. After the absorption step, unnecessary components were blown away using a blower such that excess Pd was removed from the substrate. Thus, a surface enrichment Pd layer was formed with an enrichment zone length of ~0.75 inches. In a subsequent step, the substrate was dried at 120° C. for 30 minutes and calcined for 1 hour in air. The conditions were adjusted such that the resulting Pd-enrichment layer contained ~80% of total Pd in the sample. The Pd enrichment zone exhibits a Pd gradient with decreasing Pd concentration moving from the top of the bottom coat towards the substrate. The gradient was set such that at least 50% of the Pd in the enrichment zone was located in the top third (%) of the bottom coat.

Preparation of the top coat: 4 g/ft$^3$ of Rh (100 wt. % of the total Rh) and 38 g/ft$^3$ of Pt (100 wt. % of the total Pt) in the form of rhodium precursor solution and Pt precursor solution were impregnated onto a refractory alumina. A slurry mixture containing about 83 wt. % of the refractory $Al_2O_3$, 14.6 wt. % of a ceria-zirconia composite with approximately 50 wt. % ceria, 0.2 wt. % of Rh and 2.1 wt. % Pt was coated over the bottom coat. The washcoat loading of the top coat was about 1.00 g/in$^3$ after calcination at 550° C. for 1 hour in air. Catalyst D is illustrated in FIG. 1.

EXAMPLE 5

Preparation of CC1 Inventive Catalyst E

Inventive Catalyst E is a Pt/Pd/Rh catalytic article with a PGM loading of 80 g/ft$^3$ (Pt/Pd/Rh=38/38/4). Catalyst E comprises a washcoat architecture composed of a bottom coat, an additional PGM enrichment zone in the inlet side of the catalyst, and a top coat coated onto a cylindrical monolithic cordierite substrate having dimensions of 4.66" in diameter and 3.58" in length, a cell density of 600 cpsi, and a wall thickness of 3.5 mils.

Preparation of the bottom coat: The bottom coat was identical to the bottom coat of Catalyst D.

Preparation of the enrichment zone in the inlet side of the catalyst: The enrichment zone was identical to the enrichment zone of Catalyst D.

Preparation of the top coat: 4 g/ft$^3$ of Rh (100 wt. % of the total Rh) and 38 g/ft$^3$ of Pt (100 wt. % of the total Pt) in the form of rhodium precursor solution and Pt precursor solution were impregnated onto a refractory alumina/zirconia. A slurry mixture, which contained about 83 wt. % of the refractory $Al_2O_3/ZrO_2$ with a $ZrO_2$ content of 20 wt. %, 14.6 wt. % of a ceria-zirconia composite with approximately 50 wt. % ceria, 0.2 wt. % of Rh and 2.1 wt. % Pt, was coated over the bottom coat. The washcoat loading of the top coat was about 1.00 g/in$^3$ after calcination at 550° C. for 1 hour in air. Catalyst E is illustrated in FIG. 1.

EXAMPLE 6

Preparation of CC1 Inventive Catalyst F

Inventive Catalyst F is a Pt/Pd/Rh catalytic article with a PGM loading of 80 g/ft$^3$ (Pt/Pd/Rh=38/38/4). Catalyst F comprises a washcoat architecture composed of a bottom coat, an additional PGM enrichment zone in the inlet side of the catalyst, and a top coat coated onto a cylindrical monolithic cordierite substrate having dimensions of 4.66" in diameter and 3.58" in length, a cell density of 600 cpsi, and a wall thickness of 3.5 mils.

Preparation of the bottom coat: The bottom coat was identical to the bottom coat of the Catalyst D.

Preparation of the enrichment zone in the inlet side of the catalyst: The enrichment zone was identical to the enrichment zone of Catalyst D with the exception of the addition of an alumina binder material to the Pd precursor solution. The solution was mixed well and then applied to the substrate in a similar fashion to the process described for Catalyst D. The alumina/Pd precursor ratio was ~1:1 by weight.

Preparation of the top coat: The top coat was identical to the top coat Catalyst E. Catalyst F is illustrated in FIG. 1.

EXAMPLE 7

Preparation of CC1 Inventive Catalyst G

Inventive Catalyst G is a Pt/Pd/Rh catalytic article with a PGM loading of 80 g/ft$^3$ (Pt/Pd/Rh=38/38/4). Catalyst G comprises a washcoat architecture composed of a bottom coat, a top coat, and an additional PGM enrichment zone in the inlet side of the catalyst coated after the top coat coated onto a cylindrical monolithic cordierite substrate having dimensions of 4.66" in diameter and 3.58" in length, a cell density of 600 cpsi, and a wall thickness of 3.5 mils.

Preparation of the bottom coat: 19 g/ft$^3$ of Pd (50 wt. % of the total Pd) in the form of palladium precursor solution was impregnated onto a refractory alumina, and 19 g/ft$^3$ of Pd (50 wt. % of the total Pd) in the form of palladium precursor solution was impregnated onto a stabilized ceria-zirconia composite with approximately 40 wt. % ceria. A slurry, which contained about 35.4 wt. % of the refractory $Al_2O_3$, 50.1 wt. % of the stabilized ceria-zirconia composite, barium acetate to yield 11.7 wt. % of BaO, zirconium acetate to yield 2.0 wt. % of $ZrO_2$, and 0.9 wt. % of Pd, was coated onto the substrate. The washcoat loading of the bottom coat was about 2.56 g/in$^3$ after calcination at 550° C. for 1 hour in air.

Preparation of the top coat: 4 g/ft$^3$ of Rh (100 wt. % of the total Rh) in the form of rhodium precursor solution was impregnated onto a refractory alumina/ceria. A slurry mixture, which contained about 84.8 wt. % of the refractory $Al_2O_3/CeO_2$, 15.0 wt. % of a ceria-zirconia composite with approximately 50 wt. % ceria, and 0.2 wt. % of Rh, was coated over the bottom coat. The washcoat loading of the top coat was about 1.00 g/in$^3$ after calcination at 550° C. for 1 hour in air.

Preparation of the enrichment zone in the inlet side of the catalyst: A Pt precursor solution comprising 253.3 g/ft$^3$ Pt (100% of the total Pt) was allowed to absorb from the inlet end of the substrate already containing the bottom and top coats. After the absorption step, unnecessary components were blown away using a blower such that excess Pt was removed from the substrate. Thus, a surface enrichment Pt layer was formed with an enrichment zone length of ~0.55 inches. In a subsequent step, the substrate was dried at 120° C. for 30 minutes and calcined for 1 hour in air. The Pt enrichment zone in the top coat exhibits a Pt gradient with decreasing Pt concentration moving from the top of the top coat towards the substrate. The gradient was set such that at least 50% Pt in the enrichment zone was located in the uppermost third (%) of the top coat. Catalyst G is illustrated in FIG. 1.

EXAMPLE 8

Preparation of CC1 Inventive Catalyst H

Inventive Catalyst H is a Pt/Pd/Rh catalytic article with a PGM loading of 80 g/ft$^3$ (Pt/Pd/Rh=38/38/4). Catalyst H comprises a washcoat architecture composed of a bottom coat, an additional PGM enrichment zone in the inlet side of the catalyst coated after the bottom coat, and a top coat, coated onto a cylindrical monolithic cordierite substrate having dimensions of 4.66" in diameter and 3.58" in length, a cell density of 600 cpsi, and a wall thickness of 3.5 mils.

Preparation of the bottom coat: 19 g/ft$^3$ of Pd (50 wt. % of the total Pd) in the form of palladium precursor solution was impregnated onto a refractory alumina, and 19 g/ft$^3$ of Pd (50 wt. % of the total Pd) in the form of palladium precursor solution was impregnated onto a stabilized ceria-zirconia composite with approximately 40 wt. % ceria. A slurry, which contained about 35.4 wt. % of the refractory Al$_2$O$_3$, 50.1 wt. % of the stabilized ceria-zirconia composite, barium acetate to yield 11.7 wt. % of BaO, zirconium acetate to yield 2.0 wt. % of ZrO$_2$, and 0.9 wt. % of Pd, was coated onto the substrate. The washcoat loading of the bottom coat was about 2.56 g/in$^3$ after calcination at 550° C. for 1 hour in air.

Preparation of the enrichment zone in the inlet side of the catalyst: A Pt precursor solution comprising 126.7 g/ft$^3$ Pt (50% of the total Pt) was allowed to absorb from the inlet end of the substrate already containing the bottom coat. After the absorption step, unnecessary components were blown away using a blower such that excess Pt was removed from the substrate. Thus, a surface enrichment Pt layer was formed with an enrichment zone length of ~0.55 inches. In a subsequent step, the substrate was dried at 120° C. for 30 minutes and calcined for 1 hour in air. The Pt enrichment in the bottom coat exhibited a Pt gradient with decreasing Pt concentration moving from the top of the bottom coat towards the substrate. The gradient was such that at least 50% of the Pt in the enrichment zone was located in the uppermost third (%) of the bottom coat.

Preparation of the top coat: 4 g/ft$^3$ of Rh (100 wt. % of the total Rh) in the form of rhodium precursor solution and 19 g/ft$^3$ Pt (50 wt. % of the total Pt) in the form of Pt precursor solution were impregnated onto a refractory alumina/ceria. A slurry mixture, which contained about 83.9 wt. % of the refractory Al$_2$O$_3$/CeO$_2$, 14.8 wt. % of a ceria-zirconia composite with approximately 50 wt. % ceria, 0.2 wt. % of Rh, and 1.1 wt. % Pt, was coated over the bottom coat. The washcoat loading of the top coat was about 1.00 g/in$^3$ after calcination at 550° C. for 1 hour in air. Catalyst H is illustrated in FIG. 1.

EXAMPLE 9

Preparation of CC1 Inventive Catalyst I

Inventive Catalyst I is a Pt/Pd/Rh catalytic article with a PGM loading of 80 g/ft$^3$ (Pt/Pd/Rh=38/38/4). Catalyst I comprises a washcoat architecture composed of a bottom coat, a top coat, and an additional PGM enrichment zone in the inlet side of the catalyst coated after the top coat, coated onto a cylindrical monolithic cordierite substrate having dimensions of 4.66" in diameter and 3.58" in length, a cell density of 600 cpsi, and a wall thickness of 3.5 mils.

Preparation of the bottom coat: 19 g/ft$^3$ of Pd (50 wt. % of the total Pd) in the form of palladium precursor solution was impregnated onto a refractory alumina, and 19 g/ft$^3$ of Pd (50 wt. % of the total Pd) in the form of palladium precursor solution was impregnated onto a stabilized ceria-zirconia composite with approximately 40 wt. % ceria. A slurry, which contained about 35.4 wt. % of the refractory Al$_2$O$_3$, 50.1 wt. % of the stabilized ceria-zirconia composite, barium acetate to yield 11.7 wt. % of BaO, zirconium acetate to yield 2.0 wt. % of ZrO$_2$, and 0.9 wt. % of Pd, was coated onto the substrate. The washcoat loading of the bottom coat was about 2.56 g/in$^3$ after calcination at 550° C. for 1 hour in air.

Preparation of the top coat: 4 g/ft$^3$ of Rh (100 wt. % of the total Rh) in the form of rhodium precursor solution and 19 g/ft$^3$ Pt (50 wt. % of the total Pt) in the form of Pt precursor solution were impregnated onto a refractory alumina/ceria. A slurry mixture, which contained about 83.9 wt. % of the refractory Al$_2$O$_3$/CeO$_2$, 14.8 wt. % of a ceria-zirconia composite with approximately 50 wt. % ceria, 0.2 wt. % of Rh, and 1.1 wt. % Pt was coated over the bottom coat. The washcoat loading of the top coat was about 1.00 g/in$^3$ after calcination at 550° C. for 1 hour in air.

Preparation of the enrichment zone in the inlet side of the catalyst: A Pt precursor solution comprising 126.7 g/ft$^3$ Pt (50% of the total Pt) was allowed to absorb from the inlet end of the substrate already containing the bottom coat. After the absorption step, unnecessary components were blown away using a blower such that excess Pt was removed from the substrate. Thus, a surface enrichment Pt layer was formed with an enrichment zone length of ~0.55 inches. In a subsequent step, the substrate was dried at 120° C. for 30 minutes and calcined for 1 hour in air. The Pt enrichment zone in the top coat exhibited a Pt gradient with decreasing Pt concentration moving from the top of the top coat towards the substrate. The gradient was such that at least 50% of the Pt in the enrichment zone is located in the uppermost third (%) of the top coat. Catalyst I is illustrated in FIG. 1.

EXAMPLE 10

Preparation of UF Reference Catalyst J

Reference Catalyst J is a Rh catalytic article with a PGM loading of 3 g/ft$^3$ (Pt/Pd/Rh=0/0/3). Catalyst J comprises a single-layer washcoat architecture coated onto a cylindrical monolithic cordierite substrate having dimensions of 4.66" in diameter and 4.4" in length, a cell density of 400 cpsi, and a wall thickness of 4 mils.

3 g/ft$^3$ of Rh (100 wt. % of the total Rh) in the form of rhodium precursor solution was mixed with water, a refractory alumina and a stabilized ceria-zirconia composite with approximately 40 wt. % ceria. A slurry containing about 63.1 wt. % of the refractory Al$_2$O$_3$, 32.0 wt. % of the stabilized ceria-zirconia composite, barium acetate to yield 1.5 wt. % of BaO, zirconium acetate to yield 0.3 wt. % of ZrO$_2$, strontium acetate to yield 1.5 wt. % SrO and 0.1 wt. % of Rh was coated onto the substrate. The washcoat loading was about 2.8 g/in$^3$ after calcination at 550° C. for 1 hour in air.

EXAMPLE 11

Testing of Catalysts

All catalysts prepared in examples 1 to 10 were aged using an exothermic aging protocol using an engine setup to operate such that the typical inlet temperature was ~940° C. and the typical catalyst bed temperature did not exceed 1000° C. The engine-out gas feed composition alternated between rich and lean to simulate typical operating conditions for a vehicle tested under the FTP-75 test protocol. All CC1 catalysts were aged using the same conditions for 50 hours. Catalyst J was used as a common underfloor catalyst and was aged using the same protocol but in the UF position, which resulted in proportionally lower effective temperatures, for 100 h.

The emission performance was tested using a 2.0 L turbocharged ULEV70 vehicle with a close-coupled+underfloor (CC+UF) emissions control system configuration operating under the FTP-75 test protocol. Each system was tested at least four times to assure high experiment repeatability and data consistency.

Figure 4:
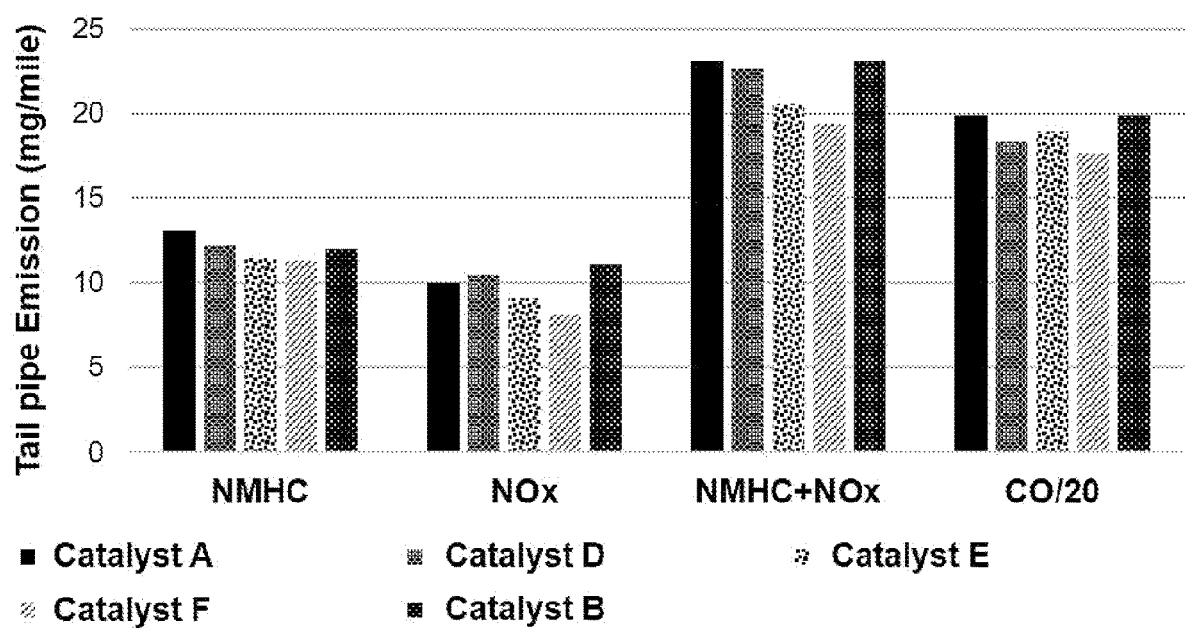
FIG. 4 shows comparative test results for cumulative non-methane hydrocarbon (NMHC), NO$_x$, and CO tail pipe emissions under the FTP-75 test cycle using emission control catalyst articles prepared according to reference Examples 1 and 2 (Catalysts A and B) and inventive Examples 4, 5, and 6 (Catalysts D, E, and F).

The benefit of using a Pd enrichment zone according to the present disclosure is demonstrated in FIG. 4. Inventive Catalysts D to F demonstrate up to 18% $NMHC+NO_x$ emission reduction compared to both the Pd/Rh reference Catalyst A as well as the Pt/Pd/Rh reference Catalyst B. Furthermore, inventive Catalysts D to F also achieve up to ~12% reduction in CO emissions compared to reference Catalysts A and B. The said catalyst systems achieve SULEV30 or better performance under chosen aging and testing conditions.

Figure 5:
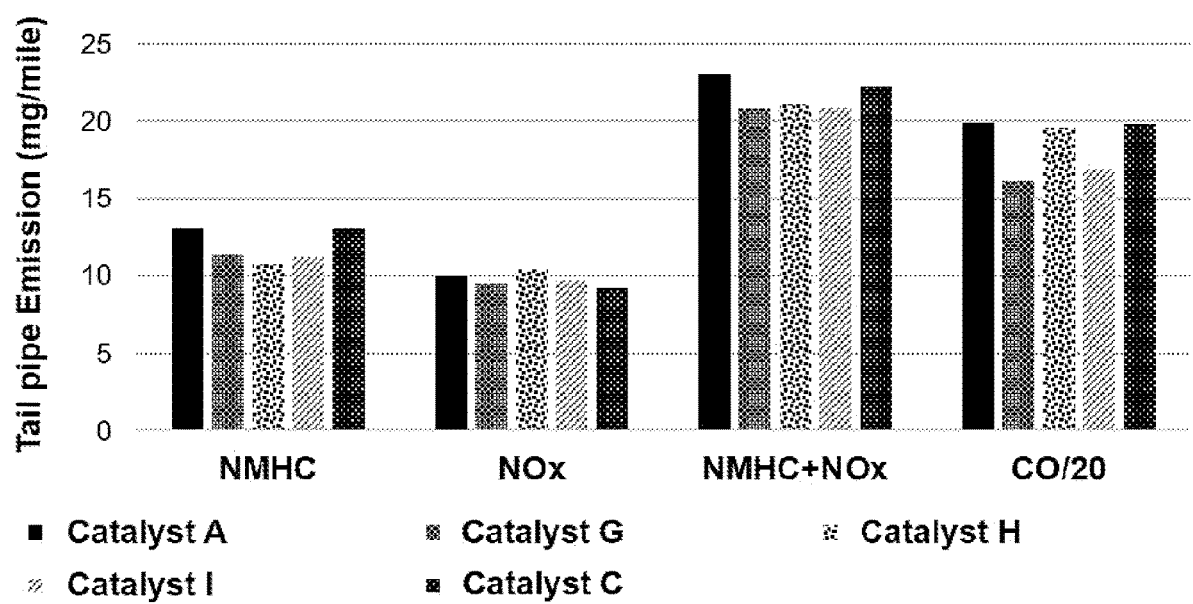
FIG. 5 shows comparative test results for cumulative NMHC, NO$_x$, and CO tail pipe emissions under the FTP-75 test cycle using emission control catalyst articles prepared according to reference Examples 1 and 3 (Catalysts A and C) and inventive Examples 7, 8, and 9 (Catalysts G, H, and I).

The benefit of using a Pt enrichment zone according to the present disclosure is demonstrated in FIG. 5. Catalysts G to I demonstrate up to 10% $NMHC+NO_x$ emission reduction compared to both the Pd/Rh reference Catalyst A as well as the Pt/Pd/Rh reference Catalyst C. Furthermore, inventive Catalysts G to I also achieve up to ~20% reduction in CO emissions compared to reference Catalysts A and C. The said catalyst systems achieve SULEV30 or better performance under chosen aging and testing conditions.

Reference throughout this specification to "one embodiment," "certain embodiments," "one or more embodiments," "an embodiment," or "some embodiments" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the present disclosure, in any of its various aspects and embodiments, should be viewed as intended to be combinable unless the context clearly dictates otherwise.

Although the embodiments disclosed herein have been described with reference to particular example embodiments it is to be understood that these embodiments are merely illustrative of the principles and applications of the present disclosure. It will be apparent to those skilled in the art that various modifications and variations can be made to the methods and apparatus of the present disclosure without departing from the spirit and scope of the present disclosure. Thus, it is intended that the present disclosure include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. An emission control catalyst article comprising:
   a substrate having an inlet axial end and an outlet axial end,
   a bottom washcoat layer coated on about 60% to about 100% of the axial length of the substrate from the inlet axial end to the outlet axial end, and
   a top washcoat layer coated on about 60% to about 100% of the axial length of the substrate from either the inlet or the outlet end of the substrate such that the top washcoat layer covers at least about 60% of the length of the bottom washcoat layer,
   wherein the top washcoat layer and/or the bottom washcoat layer comprises a first portion comprising one or more platinum group metals and a second portion comprising one or more platinum group metals,
   wherein the first portion begins at the inlet axial end of the substrate,
   wherein the platinum group metal concentration in the first portion is about 2 to about 100 times higher than the platinum group metal concentration in the second portion,
   wherein the first portion has a length of about 0.25 inches to about 2 inches, and
   wherein the platinum group metal loading in the first portion is about 10 $g/ft^3$ to about 1000 $g/ft^3$, as determined axially from a first end of the first portion to a second end of the first portion.

2. The emission control catalyst article according to claim 1, wherein the first portion is a PGM enriched zone formed by coating a portion of the top washcoat layer and/or the bottom washcoat layer, which layer is already pre-loaded with platinum group metal, with an additional platinum group metal solution.

3. The emission control catalyst article according to claim 1, wherein the one or more platinum group metals is chosen from a group consisting of platinum, palladium, rhodium, and combinations thereof.

4. The emission control catalyst article according claim 1, wherein the platinum group metal is supported on a support chosen from a group consisting of an oxygen storage component, an alumina component, a ceria component, a zirconia component, and combinations thereof.

5. The emission control catalyst article according to claim 4, wherein:
   the alumina component comprises one or more components chosen from a group consisting of alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof;
   the oxygen storage component comprises one or more components chosen from a group consisting of ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, and combinations thereof; and
   the zirconia component comprises one or more components chosen from a group consisting of lanthana-zirconia, barium-zirconia, and combinations thereof.

6. The emission control catalyst article according to claim 1, wherein the first portion has a length ranging from about 0.5 inches to about 1 inch.

7. The emission control catalyst article according to claim 1, wherein 50% or more of the platinum group metal in the first portion exists in an uppermost third (%) of the first portion, as determined by an electron-probe microanalysis (EPMA) line scan from an uppermost surface of the first portion to the substrate.

8. The emission control catalyst article according to claim 1, wherein the one or more platinum group metals in the first portion is chosen from a group consisting of palladium, platinum, rhodium, and combinations thereof.

9. The emission control catalyst article according to claim 1, wherein:

the bottom washcoat layer comprises a first portion comprising palladium or platinum optionally supported on a support chosen from a group consisting of an oxygen storage component, an alumina component, and combinations thereof and a second portion comprising palladium or platinum, wherein the concentration of palladium or platinum in the first portion is about 2 to about 100 times higher than the concentration of palladium or platinum in the second portion; and the top washcoat layer comprises one or more platinum group metals chosen from a group consisting of rhodium, platinum, and combinations thereof impregnated on a support chosen from a group consisting of an oxygen storage component, an alumina component, and combinations thereof.

10. The emission control catalyst article according to claim 9, wherein the first portion comprises palladium, wherein the amount of palladium in the first portion is about 30 wt. % to about 100 wt. % of the total palladium present in the catalyst article.

11. The emission control catalyst article according to claim 9, wherein the first portion comprises platinum, wherein the amount of platinum in the first portion is about 30 wt. % to about 100 wt. % of the total platinum present in the catalyst article.

12. The emission control catalyst article according to claim 9, wherein the first portion comprises a palladium or platinum concentration gradient, wherein the palladium or platinum concentration exponentially decreases from the top surface of the washcoat layer comprising the first portion to the bottom surface of the washcoat layer comprising the first portion.

13. The emission control catalyst article according to claim 1, wherein the weight ratio of the platinum group metal of the first portion to the platinum group metal of the second portion ranges from about 4.0 to about 50.

14. The emission control catalyst article according to claim 1, wherein:

the bottom washcoat layer comprises palladium impregnated on a support chosen from a group consisting of an oxygen storage component, an alumina component, and combinations thereof, the top washcoat layer is coated on about 60% to about 100% of the axial length of the substrate from the inlet axial end, the top washcoat layer comprises a first portion comprising palladium or platinum optionally supported on a support chosen from a group consisting of an oxygen storage component, an alumina component, and combinations thereof and a second portion comprising palladium or platinum, wherein the concentration of palladium or platinum in the first portion is about 2 to about 100 times higher than the concentration of palladium or platinum in the second portion.

15. The emission control catalyst article according to claim 1, wherein the bottom washcoat layer comprises one or more alkaline-earth metal oxides chosen from a group consisting of barium oxide, strontium oxide, and combinations thereof, in an amount of about 1.0 wt. % to about 20 wt. %, based on the total weight of the bottom washcoat layer.

16. The emission control catalyst article according to claim 1, wherein the substrate is a ceramic substrate, a metal substrate, a ceramic foam substrate, a polymer foam substrate, or a woven fibre substrate.

17. An exhaust system for internal combustion engines, said system comprising the emission control catalyst article according to claim 1.

18. A method of treating a gaseous exhaust stream comprising hydrocarbons, carbon monoxide, and nitrogen oxides, the method comprising contacting the exhaust stream with the emission control catalyst article according to claim 1.

19. A method of reducing hydrocarbon, carbon monoxide, and nitrogen oxide levels in a gaseous exhaust stream, the method comprising contacting the gaseous exhaust stream with the emission control catalyst article according to claim 1 to reduce the levels of hydrocarbons, carbon monoxide, and nitrogen oxides in the exhaust gas.

\* \* \* \* \*